United States Patent
Douziech et al.

(10) Patent No.: US 11,022,247 B2
(45) Date of Patent: Jun. 1, 2021

(54) PIPELINE SENSOR CONDUIT AND ADHESION METHOD

(71) Applicant: CCI Inc., Edmonton (CA)

(72) Inventors: Ed Douziech, St. Albert (CA); Anthony Warren, Edmonton (CA)

(73) Assignee: CCI Inc., Edmonton (CA)

( * ) Notice: Subject to any disclaimer, the term of this patent is extended or adjusted under 35 U.S.C. 154(b) by 114 days.

(21) Appl. No.: 16/208,057

(22) Filed: Dec. 3, 2018

(65) Prior Publication Data

US 2020/0132238 A1     Apr. 30, 2020

(30) Foreign Application Priority Data

Oct. 29, 2018  (CA) .................................... 3022394

(51) Int. Cl.
| | |
|---|---|
| *F16L 55/07* | (2006.01) |
| *G01M 3/38* | (2006.01) |
| *F16L 47/22* | (2006.01) |
| *F16L 7/00* | (2006.01) |

(52) U.S. Cl.
CPC .............. *F16L 55/07* (2013.01); *F16L 7/00* (2013.01); *F16L 47/22* (2013.01); *G01M 3/38* (2013.01)

(58) Field of Classification Search
CPC .......... F16L 55/07; F16L 17/00; F16L 47/22; G01M 3/38
USPC ................................................. 138/115, 141
See application file for complete search history.

(56) References Cited

U.S. PATENT DOCUMENTS

| | | | |
|---|---|---|---|
| 5,026,141 A | 6/1991 | Griffiths | |
| 5,172,730 A * | 12/1992 | Driver | G01M 3/18 138/104 |
| 5,213,379 A * | 5/1993 | Taniguchi | B29C 53/585 138/109 |
| 5,381,511 A * | 1/1995 | Bahar | F16L 11/12 392/472 |
| 5,511,585 A * | 4/1996 | Lee, II | F15D 1/00 138/41 |

(Continued)

FOREIGN PATENT DOCUMENTS

WO         2013/137745 A1     9/2013

OTHER PUBLICATIONS

FiOP Installation Example,<http://www.fi-ops.com> [retrieved Jun. 27, 2018], 1 page.

(Continued)

*Primary Examiner* — Craig M Schneider
*Assistant Examiner* — David R Deal
(74) *Attorney, Agent, or Firm* — Christensen O'Connor Johnson Kindness, PLLC (57) ABSTRACT

A conduit embedded in thermoplastic and adhered to a pipeline with a porous material assisting in the adhesion. The porous material is adhered to the pipeline, the porous material having at least some pores occupied by the thermoplastic. The porous material may be a sleeve of fibrous material. The adhesion may be accomplished by positioning a sleeve of fibrous material around a guide, bringing the thermoplastic into contact with the sleeve and heating the thermoplastic to cause the thermoplastic to enter pores of the sleeve. The guide forms a barrier preventing the thermoplastic from reaching a portion of the sleeve, and that portion is adhered to the object. This method may also be applied to adhere a thermoplastic, with or without a conduit, to any object.

6 Claims, 6 Drawing Sheets

(56) References Cited

U.S. PATENT DOCUMENTS

| | | | | |
|---|---|---|---|---|
| 5,551,484 | A | * | 9/1996 | Charboneau ........ F16L 55/1656 138/104 |
| 5,804,713 | A | | 9/1998 | Kluth |
| 5,967,192 | A | * | 10/1999 | Lewin .................. F16L 55/179 138/96 R |
| 6,395,210 | B1 | | 5/2002 | Head et al. |
| 7,096,890 | B2 | * | 8/2006 | Woolstencroft .... F16L 55/1656 138/125 |
| 9,297,480 | B2 | | 3/2016 | Dutoit et al. |
| 9,556,977 | B2 | * | 1/2017 | McNab .................. F16L 11/00 |
| 9,945,504 | B2 | * | 4/2018 | Bichler ................ F16L 55/165 |
| 2006/0151656 | A1 | * | 7/2006 | Gallagher ........... F16L 55/1652 242/437 |
| 2011/0083766 | A1 | * | 4/2011 | Anders ................ F16L 55/179 138/98 |
| 2012/0291903 | A1 | * | 11/2012 | Ekelund ............. F16L 55/1657 138/97 |
| 2015/0053293 | A1 | * | 2/2015 | Ophaug ................... B32B 5/18 138/33 |
| 2020/0152354 | A1 | * | 5/2020 | Wagner ................. H01B 13/26 |

OTHER PUBLICATIONS

Local or Remote? What is FiOPS?, Fiber Optic Pipeline Solutions <http://www.fi-ops.com> [retrieved Jun. 27, 2018], 2 pages.

Frings, J., "Enhanced Pipeline Monitoring with Fiber Optic Sensors," 6th Pipeline Technology Conference 2011, 12 pages.

Inaudi, D., et al., "Distributed Fibre-Optic Sensing for Long-Range Monitoring of Pipelines," 3rd International Conference on Structural Health Monitoring of Intelligent Infrastructure, Vancouver British Columbia, Nov. 13-16, 2007; 8 pages.

Subsea, "Omnisens Securing Subsea Asset Integrity," <http://www.omnisens.com> [retrieved Jun. 27, 2018], 4 pages.

Omnisens, "Flowlines, Pipelines, Subsea Tiebacks," <http://www.omnisens.com> [retrieved Jun. 27, 2018], 6 pages.

Written Opinion and International Search Report dated Jan. 21, 2020, issued in corresponding International Application No. PCT/CA2019/051520, filed Oct. 29, 2019, 8 pages.

* cited by examiner

PIPELINE SENSOR CONDUIT AND ADHESION METHOD

TECHNICAL FIELD

Optical fiber pipeline sensors.

BACKGROUND

Optical fiber sensors are commonly used to detect problems with pipelines. The optical fiber sensors typically comprise optical fibers in conduits that are located at or near the pipeline. However, for trenchless pipeline installation methods such as horizontal directional drilling (HDD), typical conduit applications are likely to fail during installation or after installation when no mitigation is possible. Therefore, there is a need for an optical fiber conduit that can be more reliably used in trenchless pipeline installation such as HDD.

Thermoplastics are difficult to bond to other solids using most adhesives. The adhesives that do work well with them are orders of magnitude more expensive and subject to sometimes limiting curing issues, than other structural adhesives such as epoxies and urethane adhesives.

SUMMARY

There is provided a structure including a pipeline, a conduit embedded in a thermoplastic, and a porous material with pores, at least some of the pores occupied by the thermoplastic, adhesive the porous material being between, and adhered to each of, the pipeline and the thermoplastic.

In various embodiments, there may be included any one or more of the following features: the porous material is adhered to the pipeline by an adhesive which occupies additional pores of the porous material. The porous material may comprise fibers. The porous material may comprise a sleeve. There may be an optical fiber within the conduit. There may be a second conduit embedded in the thermoplastic.

There is also provided a method of adhering a thermoplastic to an object, the method including positioning a sleeve of fibrous material around a guide, bringing the thermoplastic into contact with the sleeve and heating the thermoplastic to cause the thermoplastic to enter pores of the sleeve, the guide forming a barrier preventing the thermoplastic from reaching a portion of the sleeve, and adhering the portion of the sleeve to the object.

In various embodiments, there may be included any one or more of the following features: positioning the sleeve around the guide may include obtaining a rod shaped to curve around and be supported by plural rollers, supporting the rod with the rollers, connecting an output end of the rod to the guide, fitting a sleeve over an input end of the rod, and driving the rollers to progress the sleeve over the rod and around the guide. The guide may be progressed off of the guide after the thermoplastic has entered the pores of the sleeve. Heating the thermoplastic material may include heating the guide, the guide being formed of a heat conductive material. The object may be a pipeline. The thermoplastic may enclose a conduit. The method may also include inserting an optical fiber into the conduit.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
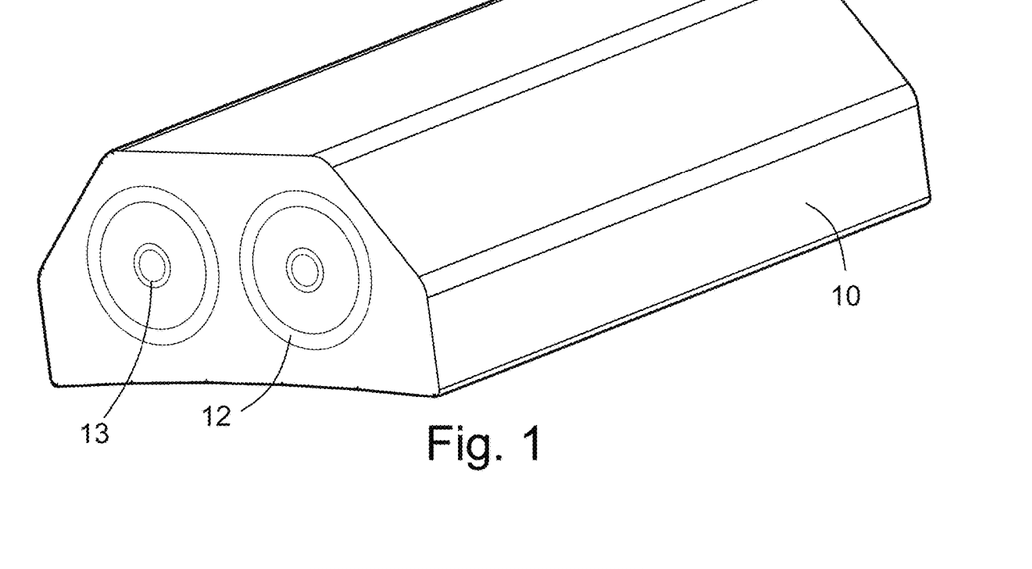
FIG. 1 is an isometric view of conduits for carrying optical fibers in an encapsulating material.

FIG. 1 is an isometric view of conduits for carrying optical fibers, surrounded by an encapsulating material. As shown in FIG. 1, an encapsulating material 10 includes conduits 12. The encapsulating material may be a thermoplastic, for example polyurethane. The conduits 12 in the embodiment shown are stainless steel tubes, but they could be made of any number of other materials such as extruded plastics, pultruded fibreglass reinforced (or other fibres) plastics, other metals, etc. The encapsulating material may be formed around the conduits, for example by extrusion. Optical fibers 13 may be placed in the conduits 12, for example by pulling the fibers 13 into the conduits. The optical fibers 13 can be optic bundles or one or more individual fiber optic fibers. The optical fibers 13 may be inserted into the conduits 12 after the composite is attached to an object, but could also be inserted into the tube prior to extrusion of the encapsulating material, or after the encapsulating material is extruded and prior to attachment to an object.

Figure 2:
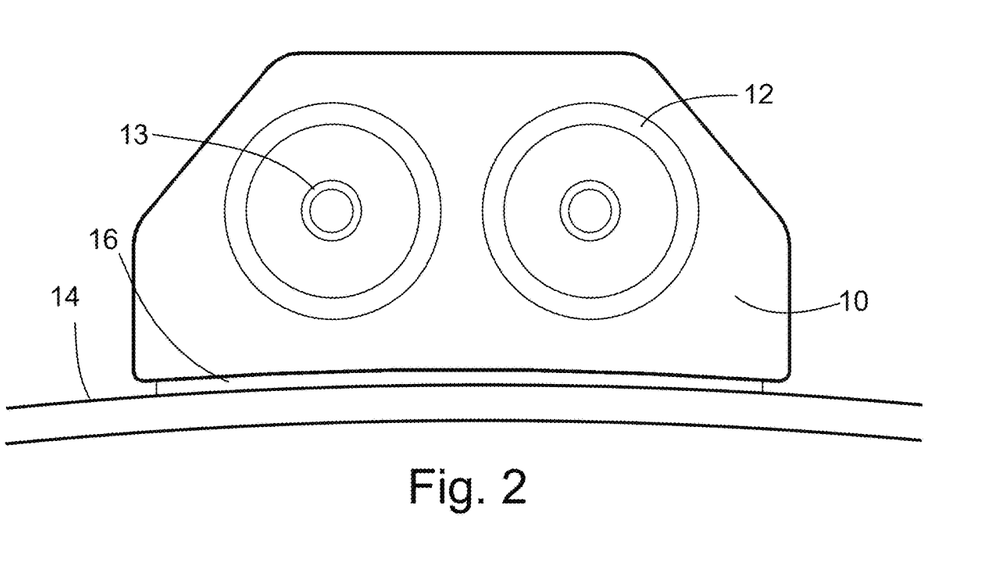
FIG. 2 is an end view of the encapsulating material and conduits of FIG. 1 attached to a pipeline.

FIG. 2 shows the encapsulating material 10 and conduits 12 adhered to a pipeline 14. An adhesive material 16 is provided between the encapsulating material 10 and the pipeline 14. The adhesive material 16 may be, for example, a portion of a fiberglass sleeve saturated with adhesives as described below.

There is provided a means of welding preformed or inline created fiber sleeves to the thermoplastic or thermoset plastic materials. The plastic materials can be any length or width.

The plastic material is brought into intimate contact with the fiber sleeves. Inside the sleeves a guide is inserted. This guide can be inserted as the sleeve is formed, or the guide can be held in place as the sleeve is drawn over it. As the sleeve is brought into contact with the plastic, heat and pressure are applied. The heat and pressure cause the plastic to melt and flow and encapsulate the fiber sleeve. The guide forms a barrier such that the plastic, under heat and pressure cannot flow past it. The result is a layer of fiber that is not encapsulated with the plastic. That fiber can later be saturated with adhesives and thereafter bonded to any other solid material that is prepared to accept adhesive bonding.

The results are the creation of a high strength, easy to bond to solid materials composite.

Figure 3:
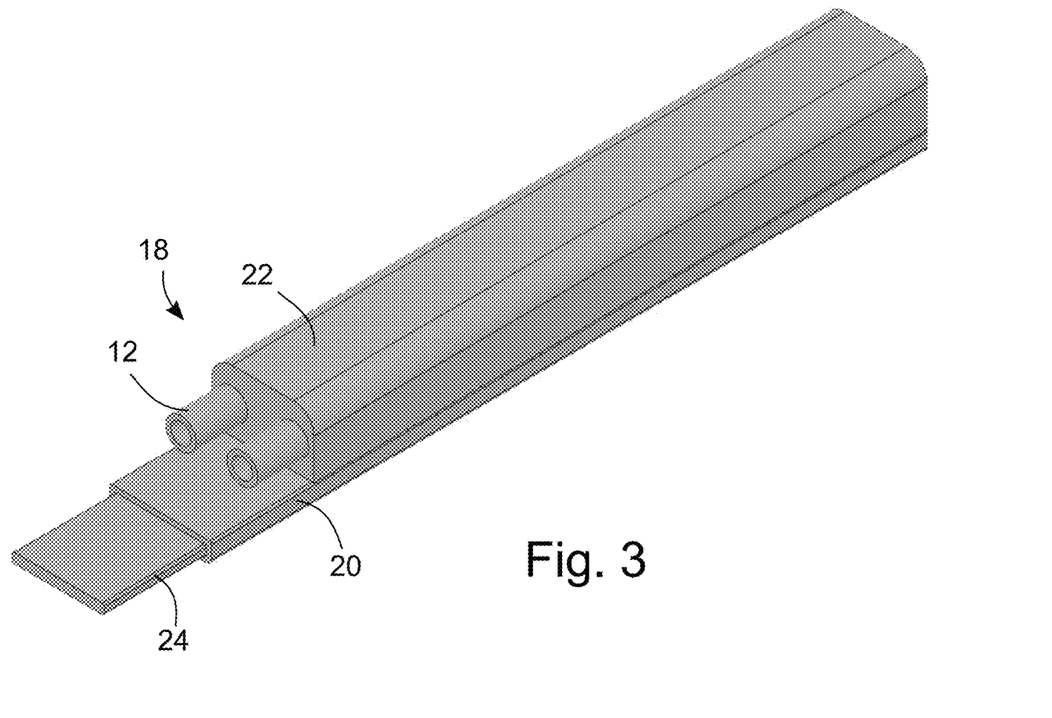
FIG. 3 is a perspective view of a thermoplastic material bonded to a composite for adhesion to another object.

FIG. 3 shows a composite 18 comprising a sleeve 20 bonded to a thermoplastic material 22. The sleeve 20 shown is a fibre tube. Inside the fibre tube 20 is a guide 24. The fibre tube 20 may be slideably disposed on the guide 24, and removed from the guide 24 before it is bonded to another object; it is not typically part of the composite. The thermoplastic material 22 may be selected to be both suitable for use as a part to be adhered to another solid material; and one that has a sufficiently high melt-flow index to be able to saturate the preformed fiber sleeve 20. The thermoplastic is shown in direct and intimate contact with the preformed fibre sleeve. The thermoplastic may be formed as an encapsulating material for conduits 12 as described above and shown in FIGS. 1 and 2. The conduits may contain optical fibers 13 as shown in FIGS. 1 and 2, but the optical fibers are not shown in FIG. 3.

The preformed fibre tube 20 can be manufactured by several means, including knitting, from flat woven or braided materials sewn into tubular shapes, helical winding, braiding, and other methods known in the art. The fibre tube 20 can also be made by inline processes, by attaching machines capable of making tubes of fibres to the front end of the processes used in the invention. The fibres used in either process can be from a wide selection of fibres that can withstand the necessary heat to melt the surface of the thermoplastic material 22. The fibres include but are not limited to; fibreglass, basalt fibres, quartz fibres, aramid fibres, para aramid fibres, PBO fibres, liquid crystal fibres, semi-liquid crystal fibres, carbon fibres, nylon fibres, and ceramic fibres.

Figure 4:
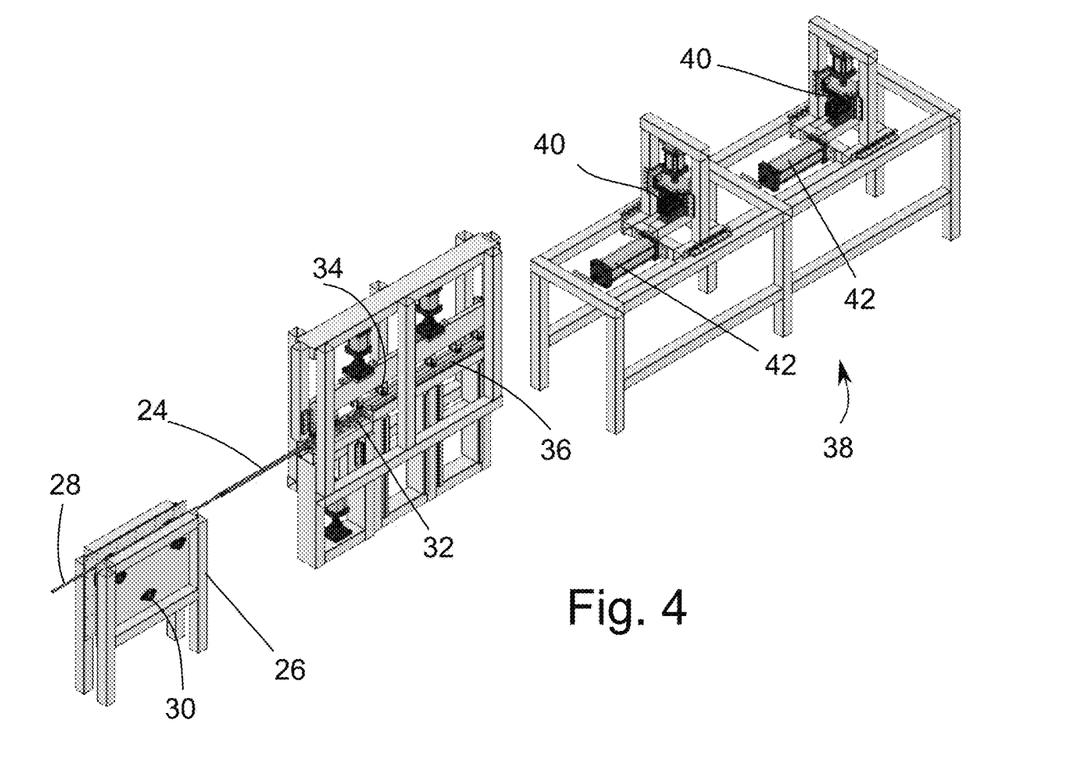
FIG. 4 is a perspective view of a machine that automates the process of making composites as shown in FIG. 3.
Figure 5:
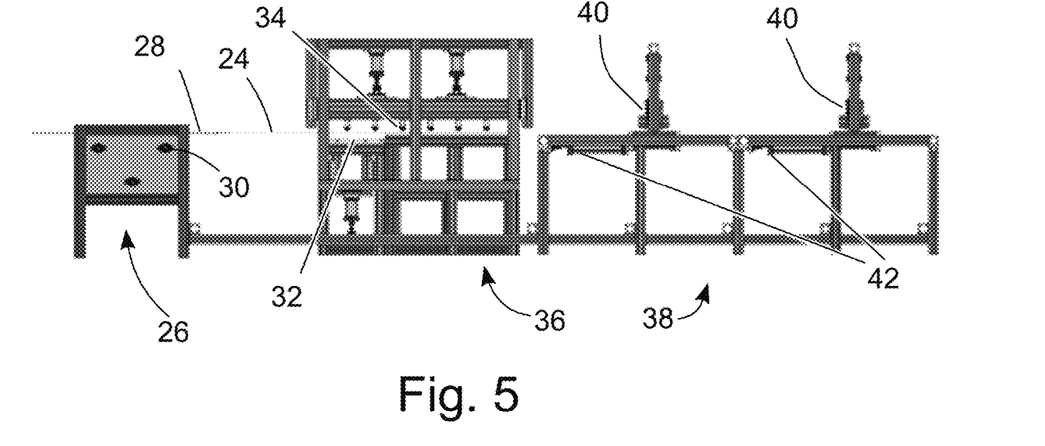
FIG. 5 is a side view of the machine of FIG. 4.

FIG. 4 shows a perspective view, and FIG. 5 a side view, of an exemplary embodiment of a machine for forming a composite as shown in FIG. 3. FIG. 4 and FIG. 5 have differences in a structural frame but the functional elements of the machine shown and described are the same in the two figures. The machine is made up of several major components. Preformed fiber sleeves 20 (not shown in FIGS. 4 and 5) are held on reels (not shown) and fed into a continuous preformed fibre sleeve input device 26 from those reels. The fibre sleeve 20 travels along the path of an 'omega' shaped support 28 that is held in place by three wheels 30. As the preformed fibre sleeve 20 moves along through the continuous preformed fiber sleeve infeed device 26 it passes over and surrounds the guide 24. The guide 24 can be made of a heat conductive material. The heat conductive guide 24 can transfer heat though the bottom layer of the fibre sleeve 20, and through the top layer of the fibre sleeve 20. This heating can take place at any stage either by heating the continuous preformed fiber sleeve infeed device 26, and/or heating it in a heating device 32. This makes the entire fibre sleeve hot. When the thermoplastic material 22 (not shown in FIGS. 4 and 5) is fed into the machine and comes into contact with the fibre sleeve 20, pressure is applied by a series of roller clamps 34 onto it and the top side of the hot fibre sleeve 20. The combination of heat and pressure causes the bottom surface of the thermoplastic 22 to melt and flow through the top layer of the preformed fibre sleeve. The composite 18 of the thermoplastic 22 and sleeve 20 as shown in FIG. 3 then moves along the machine to a chilling device 36.

In this embodiment of the invention, the progress of the composite 18 as described in FIG. 3 through the process is regulated by a linear motion device 38. In an alternating fashion the composite is first clamped by one of the material clamps 40, it is then moved by the linear motion cylinder 42 attached to the corresponding material clamp 40. As the composite is moved clamped and moved forward by one of the two material clamps 40 and linear motion cylinders 42, the second of the two material clamps 40 is opened and the linear motion cylinder 42 is returned to its home status. In this fashion the progress of the composite material through the machine can be precisely controlled.

There are other potential means to achieve essentially the same results as described in this embodiment. These include but are not limited to; using heated rollers to supply heat and pressure, chilling rolls to supply cooling, any number of alternative linear motion systems to move the composite through the process. Alternatives could also include using the linear motion to act in a stepped fashion, whereby the composite is processed in each station by having a time dwell and then rapid movement to the next station. For example, the roller clamps in the heating and cooling systems could be replaced by solid clamps. The materials would be put under pressure and heat for some period of time, the clamps deactivated, the materials would then proceed down the line to the chilling station and solid clamps activated to allow cooling of the materials.

The ability to feed the preformed fibre sleeve 20 as described in FIG. 3 over the guide 24 as shown in FIG. 4 and FIG. 5 negates the need to manufacture the preformed fibre sleeve 20 as shown in FIG. 3 over top of the guide 24 as shown in FIG. 3.

Avoiding manufacturing the preformed fibre sleeve 20 over the guide 24 can reduce cost and avoid the need to include a material that may cause corrosion issues in the composite and to what it may be adhered to. If a metal guide is included within the sleeve, it could cause corrosion to the object to which it is bonded (e.g. pipe 14) or to the composite itself. For example, copper oxidizes and can react with some of the chemicals in both the adhesive and water which can cause the destruction of the epoxy resins used to make the composite. It could also cause a potential loss of galvanic protection and destroy the pipe coating's bond to the pipe and ultimately loss of the metal of the pipe itself, should there be a void in the coating of the pipe.

Figure 6:
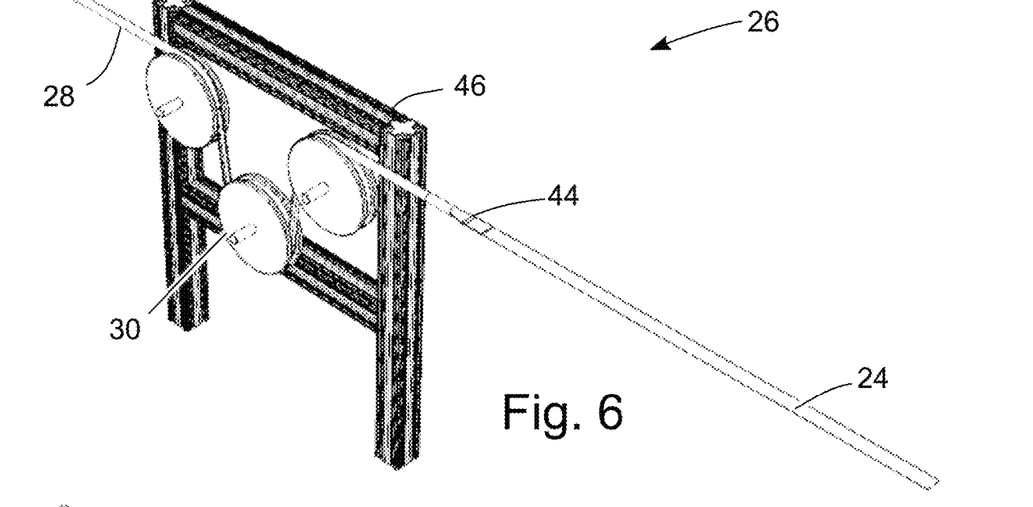
FIG. 6 is a perspective view of elements of the machine of FIG. 4 for feeding a preformed fiber sleeve over a guide, including a support structure.

FIG. 6 is a perspective view of the continuous fibre sleeve infeed device 26 including a support structure 46. Preformed fibre sleeve material is passed over the omega support 28 which is held in place by omega support wheels 30. As the preformed fibre sleeve progresses through the machine, it passes around the guide 24. The omega 28 can be manufactured from round, square, or rectangular materials. A transition clamp 44 attaches to the omega support 28 and the guide 24. This transition allows the preformed fibre sleeve 20 (not shown in FIGS. 4-8) to be correctly arranged over the guide 24.

Figures 7, 8:
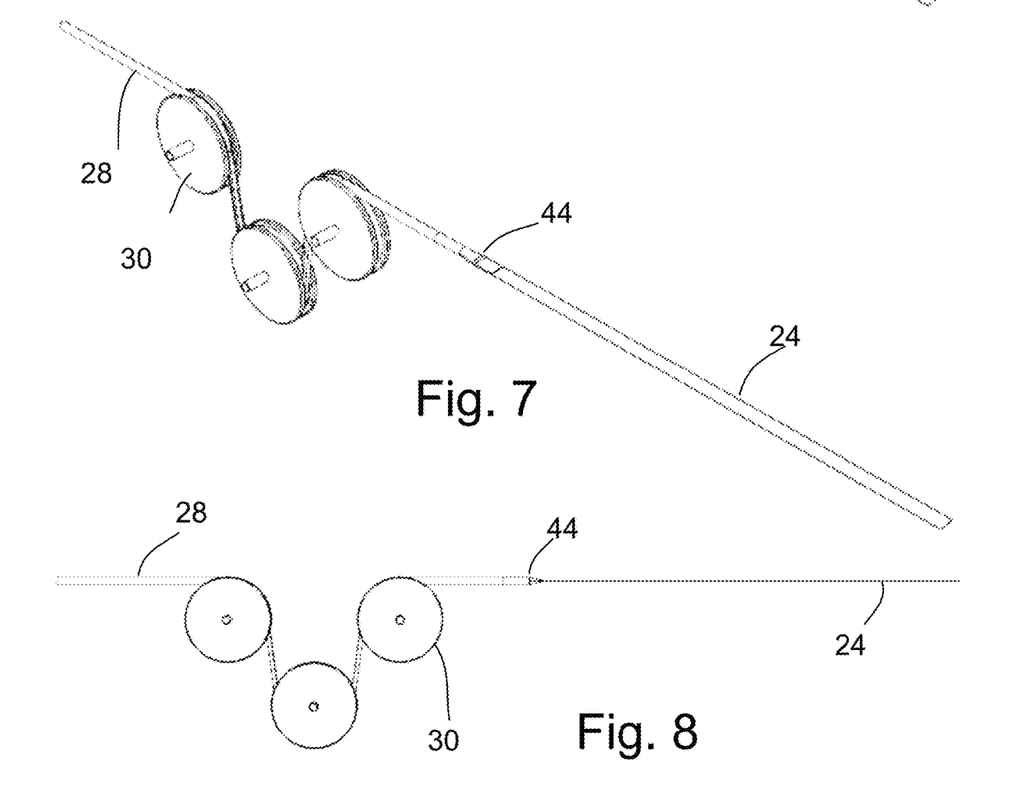
FIG. 7 is a perspective view of elements of the machine of FIG. 4 for feeding a preformed fiber sleeve over a guide.
FIG. 8 is a side view of elements of the machine of FIG. 4 for feeding a preformed fiber sleeve over a guide.

FIG. 7 is a perspective view of the omega support 28, omega support wheels 30, guide 24 and transition clamp 44. FIGS. 7 and 8 omit the support structure 46 to provide a more clear image of these components. FIG. 8 shows a side view of these components.

Figure 9:
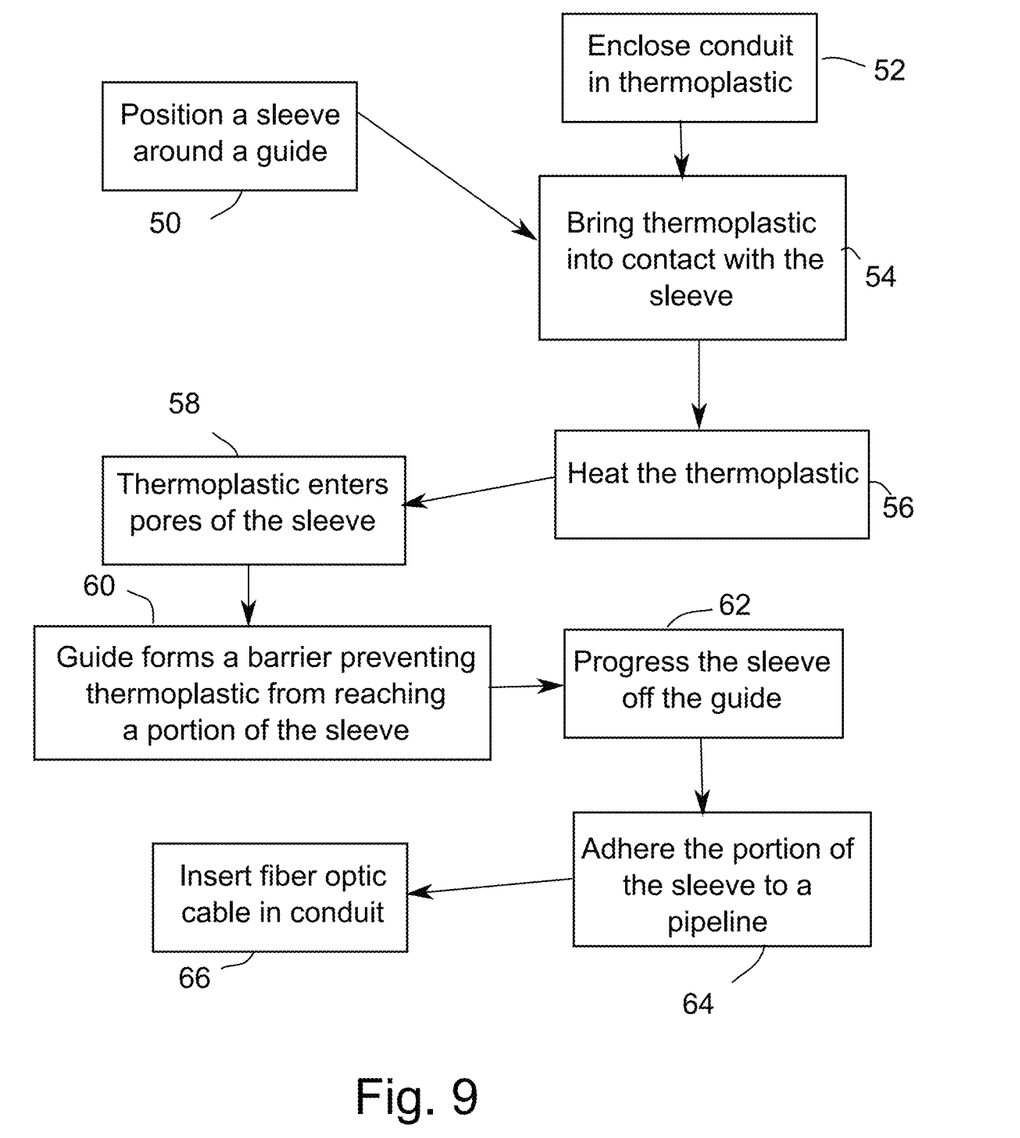
FIG. 9 is a flow chart showing a method of adhering a thermoplastic to an object.

FIG. 9 shows a flow chart of a method of adhering a thermoplastic to an object. The method as shown assumes that the object is a pipeline and includes optional steps of enclosing a conduit in the thermoplastic and inserting an optical fiber into the conduit. As shown in FIG. 9, in step 50 a sleeve of fibrous material is positioned around a guide. In optional step 52, a conduit is enclosed in thermoplastic. In step 54, the thermoplastic is brought into contact with the sleeve. In step 56, the thermoplastic is heated. In step 58, the thermoplastic enters pores of the sleeve. In step 60, the guide forms a barrier preventing the thermoplastic from reaching a portion of the sleeve. In optional step 62, the sleeve including the thermoplastic is progressed off the guide. In step 64, the sleeve is adhered to an object, here a pipeline. In step 64, an optical fiber may optionally be enclosed in the conduit, if the optional step 52 of enclosing the conduit in the thermoplastic was also carried out.

Figure 10:
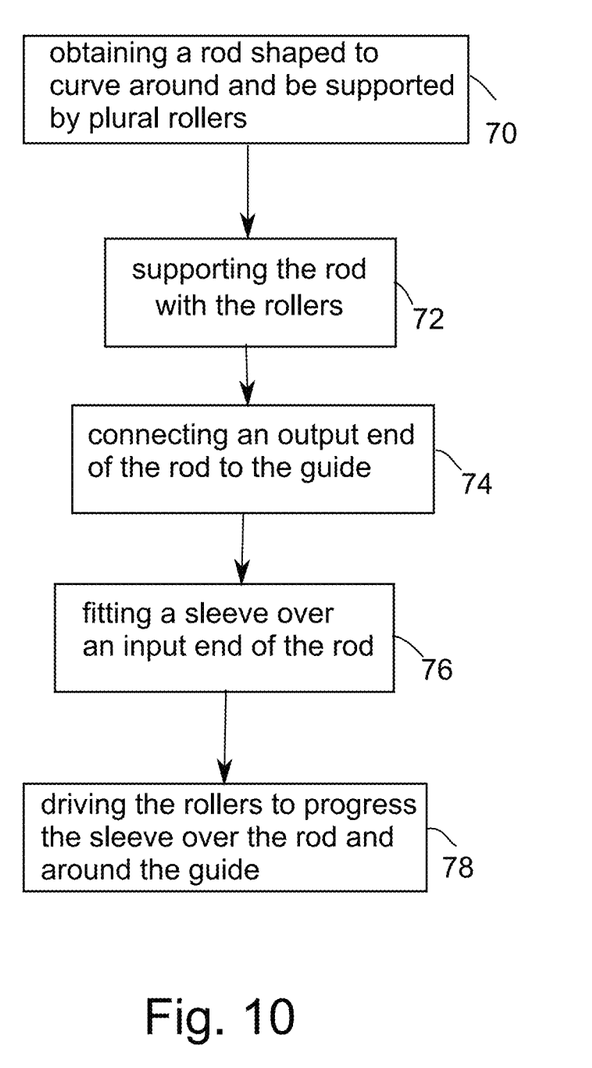
FIG. 10 is a flow chart showing a method of positioning a sleeve around a guide and progressing the sleeve.

The step of positioning a sleeve around a guide may be carried out according to the method shown in FIG. 10. As shown in FIG. 10, in step 70 a rod shaped to bend around and be supported by plural rollers is obtained. In step 72, the rod is supported with the rollers. In step 74, an output end of the rod is connected to the guide. In step 76, a sleeve is fitted over an input end of the rod. In step 78, the rollers are driven to progress the sleeve over the rod and around the guide.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A structure, comprising:
   a pipeline;
   a conduit embedded in a thermoplastic; and
   a porous material with pores, at least some of the pores occupied by the thermoplastic, the porous material being adhered to an exterior surface of the pipeline.

2. The structure of claim 1 in which the porous material is adhered to the exterior surface of the pipeline by an adhesive which occupies additional pores of the porous material.

3. The structure of claim 1 in which the porous material comprises fibers.

4. The structure of claim 3 in which the porous material comprises a sleeve.

5. The structure of claim 1 further comprising an optical fiber within the conduit.

6. The structure of claim 1 further comprising a second conduit embedded in the thermoplastic.

* * * * *